UNITED STATES PATENT OFFICE.

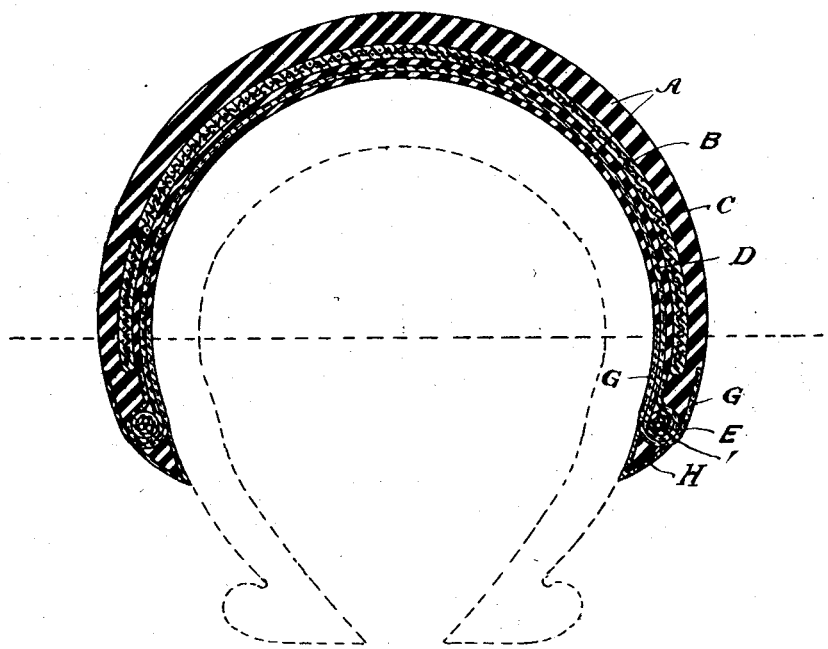
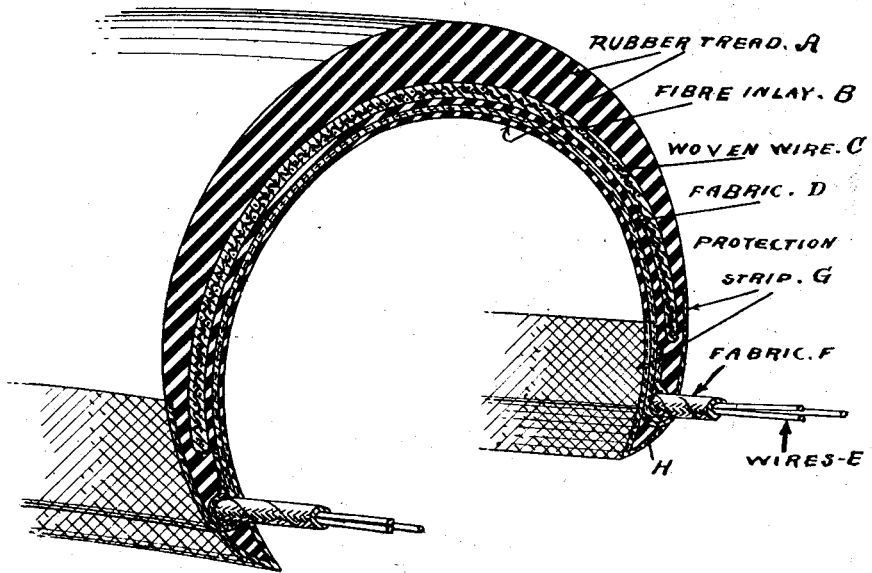

OTTO BASTEN, OF EAST RUTHERFORD, NEW JERSEY, ASSIGNOR TO RUTHERFORD RUBBER COMPANY, OF RUTHERFORD, NEW JERSEY.

AUXILIARY TREAD.

1,193,500.

Specification of Letters Patent. Patented Aug. 8, 1916.

Application filed March 3, 1915. Serial No. 11,918.

*To all whom it may concern:*

Be it known that I, OTTO BASTEN, a subject of the Emperor of Germany, residing at 81 Clinton Place, East Rutherford, New Jersey, have invented a certain new and useful Improvement in Auxiliary Treads, of which the following is a specification.

This invention relates to an auxiliary reinforcing tread, for either a new or old shoe or casing of an automobile tire.

The object of the invention is to provide an auxiliary tread which can be easily applied to a new or old tire casing, and which will act both as a tread or wearing surface therefor, and as a brace or reinforcement to resist blowouts.

With the foregoing and other objects in view, my invention resides in an auxiliary reinforcing tread and in the combination of such tread and a tire shoe, as hereinafter described and claimed, it being understood that changes in the particular embodiment of invention herein disclosed can be made, within the scope of what is claimed, without departing from the spirit of the invention.

In the accompanying drawings, forming part of this specification, Figure 1 is a sectional view through the auxiliary tread of this invention, showing the same applied to a tire shoe, which is indicated in dotted lines. Fig. 2 is a view, partly in section, partly in perspective, of the construction shown in Fig. 1.

Like reference numerals indicate like parts in the different figures of the drawing.

The tire shoe shown in dotted lines in the drawing has applied thereto the improved auxiliary and reinforcing tread of the present invention, which tread is shown in full lines. The auxiliary tread is preferably cemented to the outer surface of the tire shoe. If desired, the auxiliary tread may be vulcanized on the outer shoe, and in some emergency cases, it may be snapped on or applied to the shoe without either cementing or vulcanizing. However, I prefer that the auxiliary reinforcing tread shall be closely cemented to the tire shoe.

The auxiliary tread, in cross section, is preferably in the form of a crescent, which extends from the tread of the casing approximately two thirds of the way to the inner diameter of the casing or shoe. That is to say, the terminals or inner edges of the tread extend inward around the tire shoe beyond what is known as the "shoulder" of the shoe. In Fig. 1, the shoulder of the shoe is indicated by the broken line extending horizontally across the figure.

The inner edges of the auxiliary tread are reinforced preferably by means of circular wire reinforcements marked E. These reinforcements are firmly secured in the edges of the auxiliary tread, and are of endless circular form. The dimensions and diameter of these circular reinforcements E are such that when the auxiliary tread is in place on the tire shoe, and the shoe is under its normal degree of inflation in use, the reinforcing wires within the edges or "beads" of the auxiliary tread are placed under tension. This tension of the beads serves to stretch the auxiliary tread tightly over the shoe tread, thus bracing or reinforcing every portion of the shoe tread, and at the same time, providing a wear receiving surface for the shoe tread.

The reinforced bead is preferably of circular or uniform dimensions and cross section so that it bends or adjusts as readily in one direction as another. The result is that when the tire is inflated and the reinforced beads are placed under tension, the wires thereof adjust themselves perfectly to the shape of the shoe and to any movements thereof.

The reinforcing tread of this invention may be of any suitable form, so long as the inner edges or beads thereof extend inward beyond the line of shoulder of the shoe and are of such dimensions as to be placed under tension when the shoe is inflated so that the auxiliary tread will be drawn down like a glove, and will serve not only as a wearing surface, but as a reinforcement or brace for the shoe. I prefer, however, to construct the auxiliary tread in the manner shown in the drawing, with the exception that either the hard composition B or the wire mesh C may be omitted.

In the drawing, the reference letter A indicates the rubber body of the auxiliary tread; the letter B indicates a hard, rubberized composition or "insert" which is vulcanized within the auxiliary tread, and is preferably, although not essentially, constructed in the manner described in United States Letters Patent No. 1,065,691, granted to Franklin W. Kremer June 24, 1913, on a leather compound. This composition I shall refer to herein as the "fiber inlay", and by this expression, I desire to be understood as meaning said Kremer composition or any suitable substitute therefor.

Embedded within the center of the fiber inlay B, I employ a wire reinforcement C, which may be either woven mesh or a single wire looped back and forth, or otherwise arranged. The wire mesh C may be omitted, and in some cases, the wire mesh may be employed without the fiber inlay.

The reference letter D indicates the usual rubberized canvas or fabric which is employed in the manufacture of tire shoes, this rubberized fabric being embedded in the rubber A. The wire E of the bead is covered with fabric F and the fabric D preferably is carried at its edges around the wrapped wire E so as to form a strong connection between the wrapped wire bead of the auxiliary tread.

Protection strips G preferably are secured around the edges or beads of the auxiliary tread so as to further strengthen and protect the same.

If desired, a wedge shaped wing H may be secured to the bead, said wing being cemented or vulcanized to the tire shoe and serving as an additional means to prevent grit or dirt from entering between the shoe and the auxiliary tread. The wedge shaped wing H may, however, be omitted, if desired.

The auxiliary tread of the present invention is strong, simple, durable and inexpensive in construction, as well as thoroughly efficient in action. It may be cemented or vulcanized to either an old or a new shoe, and in some cases of emergency, may be snapped on without either cementing or vulcanizing. It serves not only as a wearing surface for the shoe, but also as a strong, tight reinforcement.

By utilizing a plurality of wires or strands E I obtain greater strength; while at the same time the fabric F prevents the strands from cutting through the tread. The fabric D folded over the fabric F along its opposite edges and the protection strips G coöperate with the wrapping fabric F and thus greatly strengthen the edge portions of the body, as will be readily understood.

While I have shown my auxiliary tread as having a smooth outer surface it is obvious that I may construct it in the non-skid form as well; placing projections such as spurs or so-called vacuum cups on its outer face to prevent slipping and make sure that this tread will take better hold upon the support surface.

What is claimed as new is:

In an auxiliary tread for incasing a tire, the combination of a body to fit over the outer surface of the tire, a plurality of endless wire reinforcements embedded in each of the edge portions of the body, a fabric covering for the reinforcements in each of said edge portions, a fabric strip embedded in the body and extending from one side to the other throughout the body and having its opposite edges folded over the reinforcements and their covers, and protecting strips folded over and attached to the inside and the outside of the edge portions and lying against portions of the fabric strip adjacent the reinforcements, to coöperate with the strip, the reinforcements, and their coverings to strengthen the edge portions of the body, said reinforcements being of such diameter as to be placed under tension by the tire, and act upon said edge portions to stretch the tread across the tire.

In testimony whereof, I OTTO BASTEN, have signed my name to this specification in the presence of two subscribing witnesses, this 11th day of Febr., 1915.

OTTO BASTEN.

Witnesses:
  SPENCER NORTON,
  A. J. SCHAUT.